C. R. HODGE, C. E. GRAHAM & R. C. WOODARD.
PLANTER.
APPLICATION FILED JULY 17, 1916.
1,216,449.
Patented Feb. 20, 1917.
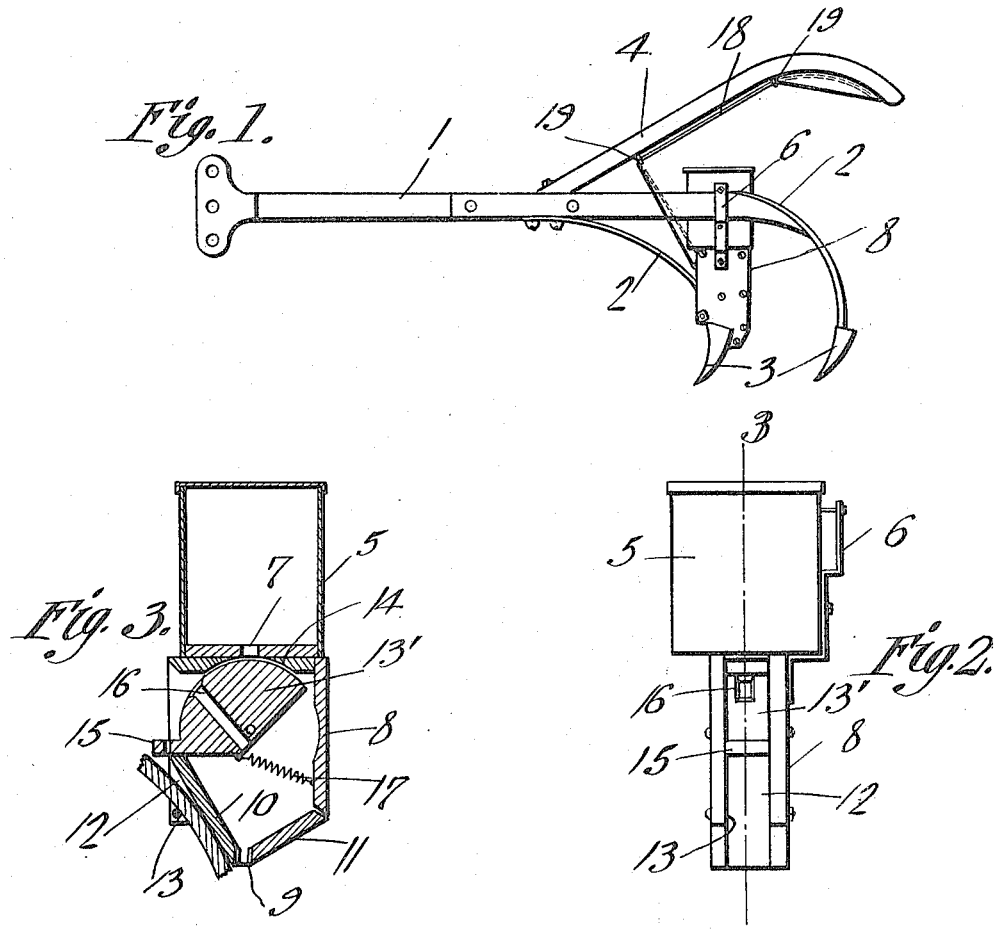
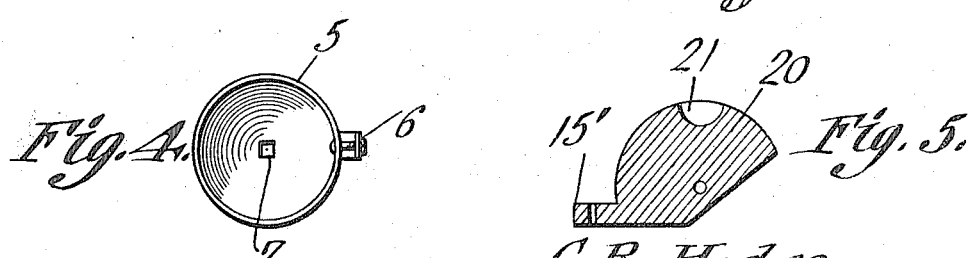

UNITED STATES PATENT OFFICE.

CHARLIE R. HODGE, CLAUD E. GRAHAM, AND ROBERT C. WOODARD, OF TAFT, TENNESSEE.

PLANTER.

1,216,449.

Specification of Letters Patent.   Patented Feb. 20, 1917.

Application filed July 17, 1916.   Serial No. 109,721.

*To all whom it may concern:*

Be it known that we, CHARLIE R. HODGE, CLAUD E. GRAHAM, and ROBERT C. WOODARD, citizens of the United States, residing at Taft, in the county of Lincoln, State of Tennessee, have invented a new and useful Planter, of which the following is a specification.

This invention relates to planters and is particularly designed for planting peas, although the same can also be used for planting other seeds, for depositing fertilizer, etc.

One of the objects of the invention is to provide a planter which can be applied readily to an ordinary cultivator and the dropping mechanism of which is constantly under the control of the operator who can actuate said mechanism without removing his hands from the handles of the cultivator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a side elevation of a cultivator having the present improvements combined therewith.

Fig. 2 is a front elevation of the planter attachment.

Fig. 3 is a section on line 3—3 Fig. 2.

Fig. 4 is a plan view of the seed box with the cover removed.

Fig. 5 is a section through a modified form of dropper.

Referring to the figures by characters of reference 1 designates the beam of a cultivator from which extend the members 2 carrying the soil engaging devices 3. The construction of the cultivator can be of the usual form, handles 4 being extended upwardly and rearwardly therefrom so that said cultivator can be properly guided while in use.

The attachment designed to be used in connection with the cultivator includes a seed box 5 to one side of which is secured a bracket 6 adapted to be bolted or otherwise secured to one of the members 2. This box 5 has a central outlet opening 7 in the bottom thereof and extending downwardly from the seed box is a boot 8. The boot has an outlet opening 9 in the bottom thereof and the front and back walls of the boot converge downwardly toward this opening as shown particularly at 10 and 11 in Fig. 3. The sides of the boot are preferably extended forwardly from the inclined bottom 10 so as to provide a receiving space 12 through which one of the members 2 extends, said projecting side walls also providing shoulders 13 adapted to bear downwardly on the soil engaging device 3 under the boot.

Mounted for pivotal movement within the boot is a segmental block 13′ adapted to fit snugly within an arcuate recess 14 in the top of the boot and under the seed box. This segment has a radial arm 15 projecting beyond the boot and also has a passage 16 extending therethrough. A spring 17 is connected to the segmental block at a point removed from the center thereof and is also connected to the boot so as thus to hold the arm 15 normally pressed downwardly against the bottom section 10 of the boot and to hold the passage 16 normally removed from the outlet opening 7. A cord 18 is extended from the arm 15 and upwardly over guide members 19 on the handle 4 and is secured at its end to the extremity of one of the handles 4 so that a portion of the cord will thus be extended under and out of contact with the handle and where it can be readily grasped and pulled upon by the fingers of the hand grasping the handle.

When the machine is moved forward the soil engaging device 3 on which the boot is mounted will open a furrow and, when it is desired to discharge material from the box 5 and into the boot and thence into the furrow, the operator pulls upwardly on that portion of the cord 18 arranged under the handle. This will result in arm 15 being swung upwardly and backwardly, thus rotating the block 13′ and bringing the passage 16 into line with the outlet opening 7. As long as the passage 16 is in this position the contents of the box 5 are free to flow downwardly into the boot and thence through the opening 9 into the furrow. Whenever it is desired to cut off the flow of seeds or the like the cord 18 is released, whereupon spring 17 will return the parts to their initial positions.

Instead of providing a block such as shown at 13' in Fig. 3, a modified form of block 20, shown in Fig. 5, may be utilized. This block is not provided with a passage extending therethrough, but instead, has a pocket 21 in its periphery. This pocket or recess is normally in position under the opening 7 so that seeds and the like will be free to flow thereinto from said opening. When the arm 15' is shifted by pulling on the cord 18, the recess 21 will be moved away from the opening 7 so that the contents of recess 21 will be discharged downwardly into the boot at a point above the spring 17.

By providing a spring 17 for holding the block 13' normally in one position, means are provided whereby clogging of the passage 16 is prevented. For example, should the arm 15 while elevated be released, spring 17 would throw said arm downwardly so that it will strike violently against the upper end of the inclined wall 10, thus jarring the contents of the passage 16 and causing them to loosen and gravitate from the passage.

While the mechanism herein described is especially designed for use in planting peas, it is also to be understood that it can be employed for planting other seeds, and for distributing fertilizer. The structure is advantageous because of its simplicity and also because it can be easily applied to or taken from an ordinary cultivator. It is very compact and will not readily get out of order.

What is claimed is:—

A planting attachment for cultivators, comprising a seed box having an outlet opening in the bottom thereof, a boot depending from the seed box and having an outlet in the bottom thereof and an opening in one wall, a segmental block pivotally mounted within the boot and normally closing the outlet opening in the seed box, a radial arm extending from the block and normally resting upon one wall of the boot, said block having a passage extending therethrough, means engaging the arm for shifting the block to bring the passage into register with the outlet opening of the seed box, and yielding means within the boot and connected to the boot and block for shifting the arm, when raised, quickly into contact with one wall of the boot to jolt the block and the contents of the passage therein.

In testimony that we claim the foregoing as our own, we have hereto affixed our signatures in the presence of two witnesses.

CHARLIE R. HODGE.
CLAUD E. GRAHAM.
ROBERT C. WOODARD.

Witnesses:
S. E. COLBERT,
M. B. GRAHAM.

Copies of this patent may be obtained for five cents each, by addressing the "Commissioner of Patents, Washington, D. C."